Jan. 25, 1966 W. M. SHARPLESS 3,231,838

DIODE ASSEMBLY

Filed Sept. 26, 1963 2 Sheets-Sheet 1

INVENTOR
W. M. SHARPLESS
BY Sylvan Sherman
ATTORNEY

Jan. 25, 1966 W. M. SHARPLESS 3,231,838

DIODE ASSEMBLY

Filed Sept. 26, 1963 2 Sheets-Sheet 2

United States Patent Office 3,231,838

Patented Jan. 25, 1966

3,231,838
DIODE ASSEMBLY

William M. Sharpless, Fair Haven, N.J., assignor to Bell Telephone Laboratories, Incorporated, New York, N.Y., a corporation of New York Filed Sept. 26, 1963, Ser. No. 311,780
5 Claims. (Cl. 333—98)

This invention relates to electromagnetic wave devices and more specifically to adjustable holders for asymmetrically conducting devices for use at microwave frequencies.

Many characteristics of asymmetrically conducting devices, such as crystal diodes, have made their use desirable in the high frequency ranges of the electromagnetic wave spectrum. In U.S. Patents 2,436,830 and 2,438,521 granted to applicant on March 2, 1948, and March 30, 1948, respectively, there are disclosed various techniques for efficiently and effectively utilizing such devices in the centimeter wave regions.

In the centimeter wave, or longer microwave regions, a diode encased in a removable coaxial cartridge and located in the path of the propagating wave energy is generally satisfactory. In most instances, when such cartridges are used it is necessary to provide reactive elements, such as tuning screws, to accomplish impedance matching between the device and the waveguide in which it is mounted. As the useable frequency range has been extended into the millimeter wave region, however, the coaxial cartridge arrangement has not proven satisfactory. The high loss and distributed capacity of the cartridge and the band narrowing effects of the tuning screws are substantially limiting factors.

An alternate is afforded by a fixed mounting of the diode directly in the waveguide. However, since the effective impedance of the diode varies with changes in the operating signal level, the impedance match between the diode and the waveguide structure is only efficient over a narrow operating range. It is also a factor that since the fixed mounting precludes any possibility of later adjustment, the initial handling and assembling operations are of necessity, more exacting and hence, the cost of manufacturing such devices is substantially higher. Furthermore, when in place the diode must be firmly held in good electrically reproducible contact and still be susceptible of being removed for replacement in case of failure. In addition, the susceptibility of the diode to damage by mechanical shock creates a considerable problem in the mounting operation.

The above disadvantages are largely overcome by mounting the diode across an aperture in a thin, slab-like member of conducting material and inserting the entire slab transversely across a waveguide channel. For a more complete description of this device see U.S. Patent No. 2,871,353 granted jointly to H. T. Friis and applicant on January 27, 1959.

As the useable microwave frequency range has been extended still further into the millimeter wave regions, even the slab-like mounting device described in the above-mentioned patent displays certain limitations. First, as the operating frequency of such devices is increased, an almost imperceptible vertical displacement of the slab-like member within its holder results in serious changes in the characteristics of the overall device. This is attributed to the fact that at millimeter wave frequencies, a very small displacement can be equivalent to a significant part of the wavelength.

Therefore, one object of the present invention is to provide a holder for a crystal diode which can be accurately aligned tranvsersely in a horizontal direction across a waveguiding channel while minimizing displacements of the diode in other than the horizontal transverse direction.

The second disadvantage to the prior art slab-like holder structure arises from the thickness requirement of the conductive slab-like member. In such a device the thickness of the member is required to be less than one-half wavelength at the highest frequency of operation. This dimensional limit is dictated by the desirability for minimizing interaction between the reactive and resistive adjusting means associated with the holder assembly. As the frequency of operation increases it is readily seen that the thickness of the slab-like member must decrease in order to meet the one-half wavelength thickness limit. In the very short millimeter wavelength regions the member becomes so thin that fabricating problems become quite pronounced; moreover, such thin members are fragile and easily bent or deformed.

Accordingly, it is another object of the present invention to minimize interaction between the reactive and resistive adjustments in a slab-like holder assembly while simultaneously maintaining structural ruggedness.

The above objects are accomplished in accordance with the principles of the present invention by utilizing a slotted slab-like member. In particular, a slot is provided on each side of the conductive slab-like member in a direction parallel to the long dimension thereof, and the aperture containing the diode extends through the member between the slots. The heights of the slots are slightly greater than the height of the aperture and the waveguiding channels to which the aperture couples. When the member is inserted transversely into the holder, these slots slideably engage small guiding shoes which automatically align the aperture in the member with the adjacent waveguiding channels. In this manner accurate alignment of interchangeable slab-like members is assured while at the same time any substantial motion of the member in other than a horizontal transverse direction is minimized.

In accordance with the present invention the guiding slots also reduce the thickness of the member in the vicinity of the aperture. Since the half wavelength thickness requirement mentioned above only relates to the thickness of the member at the aperture, the slots are made deep enough so that the resulting thickness in the vicinity of the aperture and, hence, the dimension of the aperture in the direction of wave propagation, is less than one-half wavelength at the highest operating frequency. On the other hand, the main body of the slab-like member is thick enough to afford structural rigidity and ruggedness. Thus, the electrical and mechanical requirements mentioned above are simultaneously fulfilled.

The above-mentioned and other features and objects of the present invention will become more apparent by reference to the following description taken in conjunction with the accompanying drawings, in which.

Figure 1:
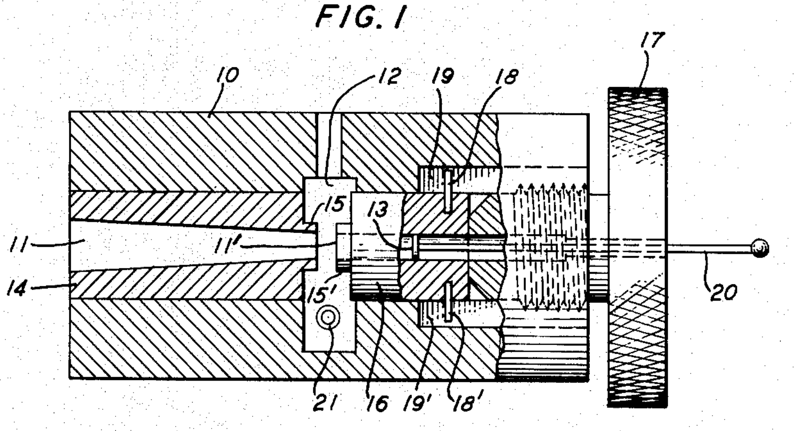
FIG. 1 is a cross-sectional view of the holder block.

Referring more specifically to the drawings, FIG. 1 is a view, in partial cross section, of the holder block. The main body of the holder consists of a block 10 of a conductive material such as brass, copper, steel or any other suitable conductive material well known in the art. A first waveguiding channel 11 of rectangular cross section extends longitudinally through block 10 to the center where it is intersected by a transversely extending opening 12 which, in operation, is occupied by a member of the type shown in FIG. 2A and to be described in greater detail hereinbelow. A second waveguiding channel 11' of rectangular cross section extends through the block on the other side of opening 12 where it is terminated by means of an adjustable shorting septum 13.

Waveguiding channel 11 can be machined or otherwise formed in block 10 or, as shown in FIG. 1, can be formed in a solid conductive cylinder 14 which is then inserted into a cylindrical longitudinal opening in the block. Conductive cylinder 14 can then be held in place by means of set screws or other suitable clamping or holding means well known in the art. By utilizing a conductive cylinder such as 14, waveguiding channels of different internal dimensions and different wall materials can be easily interchanged.

In FIG. 1, waveguiding channel 11 is depicted as having an interior narrow dimension or height which tapers from a maximum near the entrance to a minimum dimension where it enters opening 12. Although not necessary, the tapered configuration is advantageous in matching the operating impedance of the diode to the characteristic impedance of the external wave path (not shown) that connects to channel 11. In other embodiments it may be desirable to utilize an input waveguiding channel of uniform height.

Rectangular lips or shoes 15 and 15' surround the openings of the waveguiding channels 11 and 11' where they enter the transversely extended opening 12. As will be discussed in greater detail hereinbelow, shoes 15 and 15' fit into slots 23 and 23' in the slab-like member of FIG. 2A when it is inserted into the holder block.

Conductive cylinder 16, through which extends waveguiding channel 11', is similarly disposed in a cylindrical opening in block 10 having a diameter which is slightly larger than that of the cylinder. This allows cylinder 16 to be moved longitudinally within block 10 by means of thumb screw 17. The proper orientation of cylinder 16 and waveguiding channel 11 is insured during longitudinal adjustments by means of a pair of posts 18 and 18' which protrude from cylinder 16 and which are guided by keyways 19 and 19' formed in block 10.

Rod 20, which extends through a small aperture formed in the head of screw 17 is attached to shorting septum 13. As will be discussed in greater detail hereinbelow, septum 13 provides the reactive adjustment for the device.

Extending through and insulated from block 10 within transversely extending opening 12 is a female connecting chuck or plug 21 which provides a slideable electrical contact with a conductive rod 25' located on the slab-like member described below.

Figures 2A, 2B:
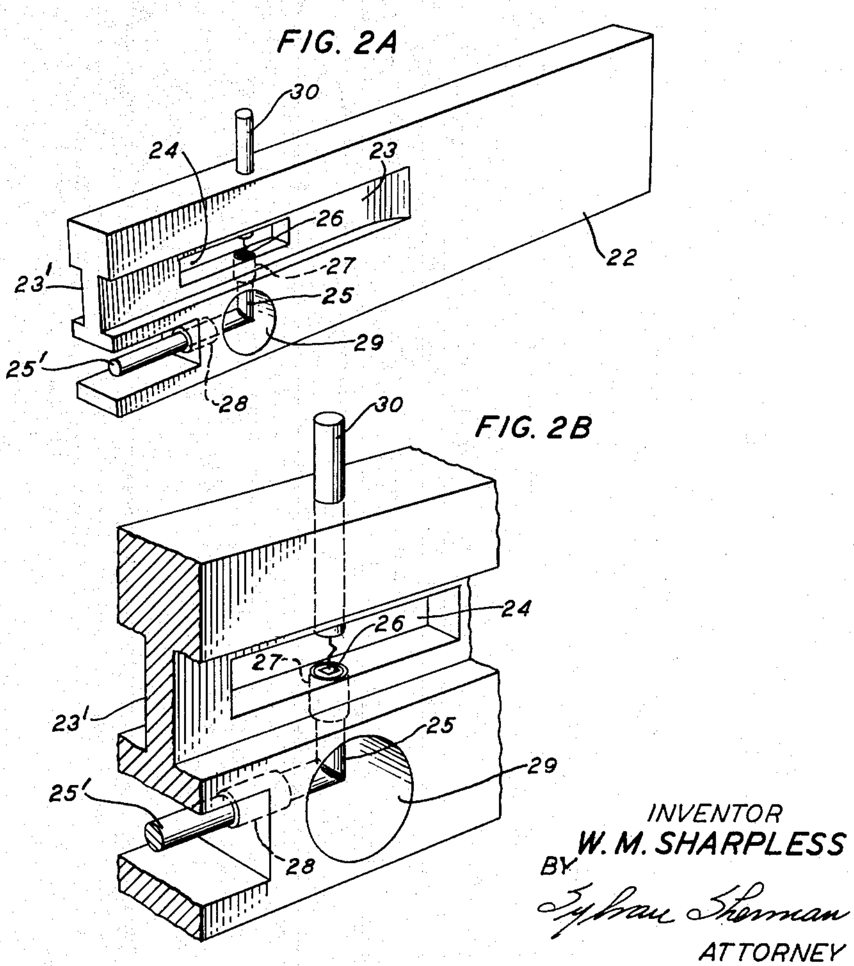
FIG. 2A is a pictorial view of the slab-like member showing an asymmetrically conducting device mounted therein.
FIG. 2B is a more detailed pictorial view of a portion of the member of FIG. 2A.

In FIG. 2A there is shown, in pictorial view, a slab-like member for use with the above-described holder block comprising a main body member 22 having a height (vertical dimension) and thickness (longitudinal dimension) only slightly less than the wide and narrow dimensions, respectively, of the transversely extending opening 12 in block 10. A pair of substantially identical slots 23 and 23' are milled or otherwise formed on opposite sides of member 22. Slots 23 and 23' extend horizontally along the broad face of member 22 in a direction parallel to the long edges thereof. The heights and depths of these slots are slightly greater than the heights and depths of shoes 15 and 15', respectively.

The length of the slab-like member 22 is chosen so that when it is fully inserted into transversely extending opening 12 a portion of the member protrudes from block 10 as a grip or handle with which to withdraw or otherwise manipulate member 22. When inserted into opening 12 in block 10, shoes 15 and 15' engage respective slots 23 and 23' thereby constraining member 22 to move only in a guided horizontal transverse direction.

Member 22 is provided with a rectangular aperture extending through its thickness between slots 23 and 23'. The wide dimension of aperture 24 is substantially larger than the wide dimension of waveguiding channels 11 and 11' and the narrow dimension thereof is substantially equal to the narrow dimension of these channels. Rectangular aperture 24 is positioned and located in member 22 so that when member 22 is inserted within opening 12 the wider walls of aperture 24 are aligned with the wider walls of waveguiding channels 11 and 11'.

When aligned in this manner, aperture 24, in effect, constitutes a connecting waveguide channel between the adjacent ends of channels 11 and 11'. The thickness of the main body of member 22 is determined by the degree of mechanical rigidity and ruggedness desired. The thickness of member 22 between slots 23 and 23' (in the direction of wave propagation) however, is made less than one-half wavelength at the highest contemplated frequency of operation. The portions of aperture 24 that extend on either side beyond the narrow walls of waveguiding channels 11 and 11' form cavities whose relative depths depend upon how far member 22 is inserted into opening 12. These cativities, however, always appear beyond cutoff because the longitudinal dimension of aperture 24 is less than half a wavelength and, therefore, they present a very small discontinuity to wave energy propagating through the waveguiding channels 11 and 11'.

Referring to the more detailed view of FIG. 2B, the asymmetrically conducting assembly is disposed within aperture 24 and extends transversely across the narrow dimension thereof. This asymmetrically conducting assembly comprises a conductive rod 25 which extends through member 22 and into aperture 24. On the end of rod 25 which extends into aperture 24 there is fastened a crystal 26 of known type. Crystal 26 can be, for example, a small wafer-like piece of semiconductive material, such as silicon, doped with a small percentage of impurity such as boron or aluminum.

Rod 25 is insulated from member 22 by a sleeve of dielectric insulating material 27, which insulating section also comprises a high-frequency bypass capacitor. A second conductive rod 25' extends through member 22 by means of insulating sleeve 28 in a direction parallel to the long edges thereof, and abuts against rod 25. A second aperture 29 is provided in member 22 in the region of the abutting junction of rods 25 and 25'. Rods 25 and 25' can be soldered at their junction in order to insure good electrical and mechanical contact.

As indicated above, rods 25 and 25' extending through member 22 comprise high-frequency bypass capacitors. Furthermore, the portions of these rods extending within aperture 29, in effect, constitute a small inductance. Thus the combination of the bypass capacitors and inductance comprises a "$\pi$-network" between the free end of rod 25' and crystal 26. In certain instances it is advantageous to adjust the values of these capacitors and inductance so that the "$\pi$-network" resonates at a particular frequency. This can be done by varying the diameters of the rods, the size of aperture 29 or the diameters or dielectric constants of insulating sleeves 27 and 28. In addition, the inductance can be increased, if necessary, by the addition of a small loop or coil within aperture 29 between the ends of rods 25 and 25'.

Referring once again to FIG. 2A, crystal 26 is engaged on its exposed surface by a conducting wire or cat whisker conductively attached to the opposite broad wall of aperture 24. This conductive attachment can be conveniently made by means of conductive rod 30 which extends through member 22 and protrudes slightly from the top surface thereof. Rod 30 is preferably brazed, soldered or otherwise held in good electrical and mechanical contact with member 22.

Although the asymmetrically conducting device of FIG. 2A is described above as a boron or aluminum doped crystal of silicon it is understood that this is solely by way of example. Many other and varied materials, substances and devices can be utilized in accordance with the present invention depending upon the desired characteristics of the assembly.

Figure 3:
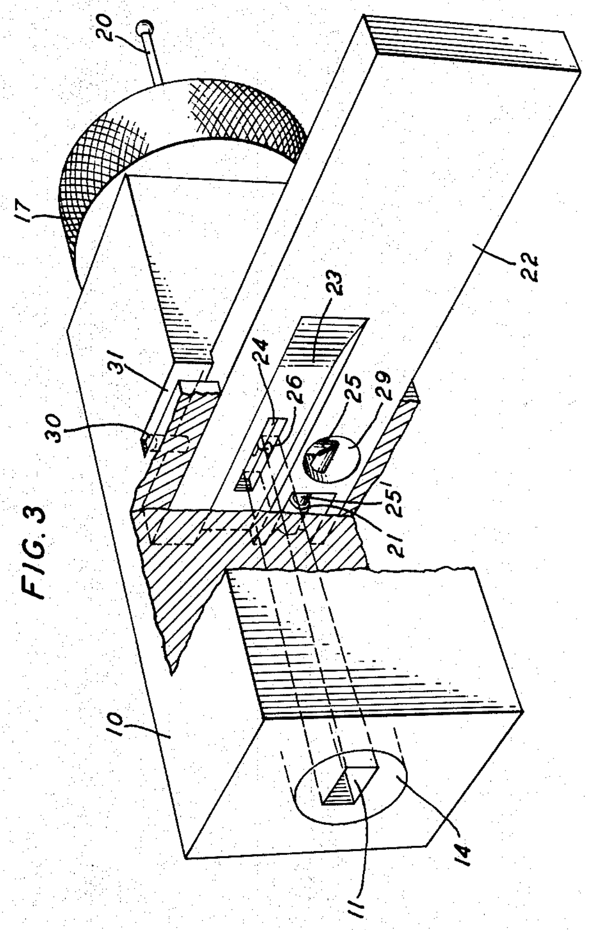
FIG. 3 is a pictorial view, partially broken away, of the slab-like member inserted in the holder block.

In the partially broken away pictorial view of FIG. 3, the slab-like member is shown in place in the holder block. In this figure like numerals have been carried over from FIGS. 1 and 2 to designate like structural elements. When member 22 is inserted into the transversely extending opening 12 in block 10, slots 23 and 23' are engaged by shoes 15 and 15', respectively. Conductive rod 25' is also engaged in slideable electrical contact with female plug 21. A slot 31 extending partially across the top of block 10 prevents member 22 from being inserted upside down and also serves as a stop.

As mentioned above, slots 23 and 23' have heights and depths that are only slightly larger than the heights and depths of shoes 15 and 15'. When inserted into opening 12, therefore, the slab-like member is positioned and guided by the shoes 15 and 15' fitting into slots 23 and 23'. When the desired transverse position of the member is reached, thumb screw 17 is tightened. The tightening action of screw 17 forces cylinder 16 to bear against member 22 thereby holding the member in place in a vice-like grip between shoes 15 and 15'. Due to the key-like fit of the slab-like member unit within the holder, no misalignment can occur between these two units.

In operation, input wave energy is applied to waveguiding chanel 11 from an external source not shown. Coupling between the external source and channel 11 can be accomplished, for example, by a waveguide flange coupler bolted to block 10. As the input wave energy propagates through waveguiding channel 11 it is acted upon by asymmetrically conducting device 26. Depending upon the function of the asymmetrically conducting device, a direct current biasing potential, or low frequency modulating potential can be supplied to the device through rod 25' and plug 21. Moreover, if the device is used as a detector, the detected output signal can also be taken from the device through rod 25' and plug 21. Ordinarily, plug 21 is connected to the external circuitry by means of a coaxial-type fitting, the center conductor of which is connected to plug 21 and the outer conductor to block 10.

The impedance of the diode is matched to waveguiding channel 11 by separately matching the resistive component and the reactive. In this connection it should be recalled that the resistive component of the impedance of a rectangular waveguide varies across the wide dimension thereof from zero adjacent to the narrow walls to a value equal to the characteristic impedance of the guide at the center line of the wide wall. In the present invention, the resistive component of the impedance of crystal 26 is matched to the resistive component of waveguide chanel 11 by adjusting the horizontal transverse position of crystal 26 in the cross section of channel 11 by inserting and withdrawing member 22 in opening 12. It is necessary that the position of crystal 26 should fall somewhere between the center line of channel 11 and one of its narrow walls for optimum match. This can be done by assuring that the impedance of the diode in member 22 is less than the characteristic impedance of channel 11 and 11' at the cross section containing the diode.

Having thus matched the resistive component of the impedance of the diode to channel 11, the reactive component of the impedance match is tuned by means of the adjustable septum 13, extending parallel to the narrow walls of channel 11'. Septum 13 is arranged to make good electrical contact with the wider walls of channel 11'. For this purpose the septum can be conveniently formed by two curved strips of resilient conductive material mounted back-to-back with their edges riding in grooves which can be milled in the wider walls of channel 11'. The effect of septum 13 is to divide channel 11' into two sections of such dimensions that each section is beyond cutoff at the highest frequency of operation contemplated. Septum 13 therefore acts to terminate channel 11' in much the same way as if the guide were terminated by a short circuiting piston at a point near the inner edge of the septum.

In all cases, it is understood that the above described arrangement is simply illustrative of one of the many possible specific embodiments which can represent applications of the principles of the present invention. Numerous and varied other arrangements can readily be devised in accordance with these principles by those skilled in the art without departing from the spirit and scope of the present invention.

What is claimed is:

1. In combination, first and second conductively bounded waveguiding structures of rectangular cross section, each having a long dimension and a narrow dimension and each capable of supporting propagating wave energy over a given band of frequencies, means for maintaining said waveguiding structures in longitudinal alignment with the long dimension of said first waveguide parallel to the long dimension of said second waveguide, the distance between adjacent ends of said waveguiding structures being less than one-half wavelength at the highest frequency of said band of frequencies, a slab-like conductive member having a thickness sufficiently greater than said distance to make said member structurally rigid, said conductive member having parallel transverse slots on both sides thereof, said slots having heights substantially equal to the narrow exterior dimensions of said waveguiding structures, the thickness of said member between said slots being substantially equal to said distance, said member capable of being inserted between said adjacent ends of said waveguiding structures with said slots slideably engaging said adjacent ends and slideably engaging a portion of the exterior surfaces of each of said waveguides along their long dimensions to permit movement of said member in a transverse direction parallel to said long dimensions and simultaneously to prevent movement of said member in a direction parallel to the narrow dimensions of said waveguides, an aperture extending through said conductive member between said slots and an asymmetrically conductive device mounted in said aperture.

2. An asymmetrically conducting crystal assembly for electromagnetic wave energy extending over a given band of frequencies, comprising a pair of longitudinally aligned conductively bounded waveguiding channels of rectangular cross section, the distance between adjacent ends of said waveguiding channels being less than one-half wavelength at the highest frequency of said band of frequencies, an asymmetrically conducting crystal, means for supporting said crystal between said channels for transverse movement in a direction parallel to the wider dimensions of said channels, said means comprising a slab-like member having a thickness sufficiently greater than said distance to make said member structurally rigid, said member having a slot on each side thereof extending in a direction parallel to said transverse movement, said slots slideably engaging the wider walls of said channels to permit transverse movement of said member in a direction parallel to said wider walls and simultaneously to prevent movement in a direction perpendicular to said wider walls, and an aperture extending through the thickness of said member between said slots, said crystal being mounted in said aperture.

3. The assembly according to claim 2 including a reflecting termination in one of said pair of channels.

4. The assembly according to claim 2 including a pair of conductive rods, one of said rods having a first end thereof in contact with a surface of said crystal, means for conductively connecting the second end of said one rod with a first end of the other rod, the second end of said other rod extending in a direction parallel to said transverse movement, and means for making electrical contact with said second end of said other rod at a plurality of transverse positions of said member.

5. The assembly according to claim 4 wherein said pair of rods constitutes a "$\pi$-network" in series with said crystal.

References Cited by the Examiner

UNITED STATES PATENTS

| | | | |
|---|---|---|---|
| 2,871,353 | 1/1959 | Friis | 329—161 |
| 3,141,141 | 7/1964 | Sharpless | 307—88.5 |

HERMAN KARL SAALBACH, *Primary Examiner.*